Figure 3:
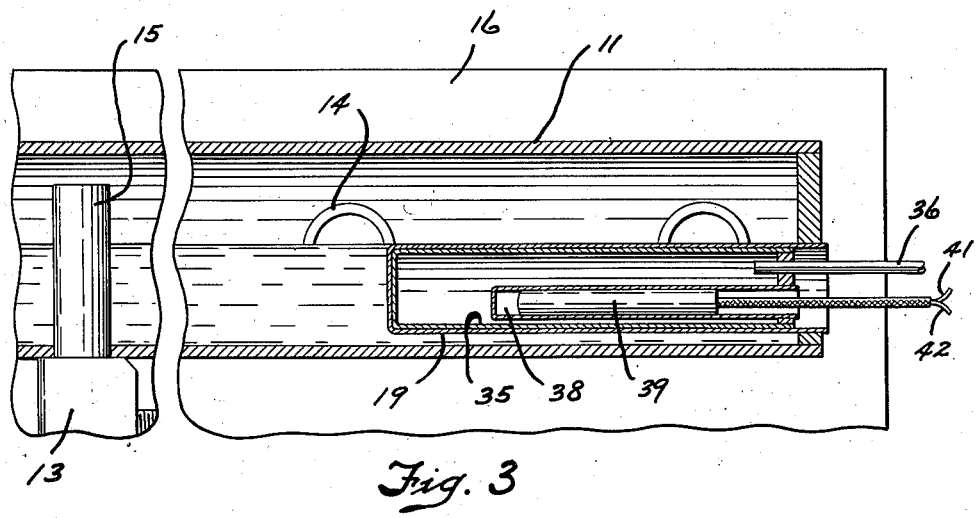

May 4, 1937. E. B. NEWILL 2,078,966

REFRIGERATING APPARATUS

Original Filed Sept. 28, 1934

INVENTOR.
EDWARD B. NEWILL.
BY
*Spencer, Hardman and Zehr*
HIS ATTORNEYS.

Patented May 4, 1937

2,078,966

UNITED STATES PATENT OFFICE 2,078,966

REFRIGERATING APPARATUS

Edward B. Newill, Dayton, Ohio, assignor to General Motors Corporation, Dayton, Ohio, a corporation of Delaware Application September 28, 1934, Serial No. 745,955
Renewed July 7, 1936

8 Claims. (Cl. 62—3)

The present invention relates to refrigerating systems and to evaporators for such systems.

The evaporator employed in the refrigerating system of the present invention and disclosed in the drawing comprising a part of the present application is similar in construction to the evaporator shown in the copending application of Herman J. Dick, Serial No. 661,201, filed on March 17, 1933. In the use of evaporators of the type disclosed and referred to it has been found that the thermostat employed for operating the expansion or other suitable valve, which controls the ingress of liquid refrigerant to the evaporator, is not at all times responsive only to the level or amount of liquid refrigerant contained in the evaporator. Due to the location of the thermostat in evaporators of the type disclosed and referred to, the thermostat will at times respond to the temperature of cold gaseous refrigerant in the evaporator instead of responding only to the temperature of the liquid refrigerant therein or to the amount of liquid refrigerant in contact with the thermostat and the level of liquid refrigerant in the evaporator will vary beyond desired limits thus impairing the cooling effect produced by the evaporator and also impairing the efficiency of the refrigerating system connected to the evaporator. In other words the thermostat is usually located in an evaporator of the type disclosed at a point where there is very little temperature difference between the liquid refrigerant and the gaseous refrigerant contained in the evaporator thus necessitating very close or critical adjustment of the valve, to be actuated by the thermostat, for maintaining the level of liquid refrigerant in the evaporator between predetermined limits. My invention is therefore directed to a refrigerating system wherein provisions are made to overcome the difficulties above enumerated by rendering the thermostat non-responsive to the temperature of gaseous refrigerant in the evaporator and responsive only to the level of liquid refrigerant in the evaporator or to the amount thereof in intimate heat exchange relation with the thermostat.

An object of my invention is to provide an improved refrigerating system and particularly a system employing an improved evaporator of the flooded type.

Another object of my invention is to provide an improved flooded evaporator for a refrigerating system, wherein the level of liquid refrigerant is maintained between predetermined limits by means of a valve actuated in response to temperatures, the evaporator having all the advantages of an evaporator employing a float operated valve.

A further and more specific object of the invention is to provide an improved flooded evaporator for a refrigerating system wherein the valve which controls ingress of liquid refrigerant to the evaporator is operated by a thermostat having a predetermined constant rate of heat supplied thereto in order to render the thermostat positive in its response to a variation in the level or amount of liquid refrigerant in the evaporator.

Further objects and advantages of the present invention will be apparent from the following description reference being had to the accompanying drawing wherein a preferred form of the present invention will be clearly shown.

Figure 1:
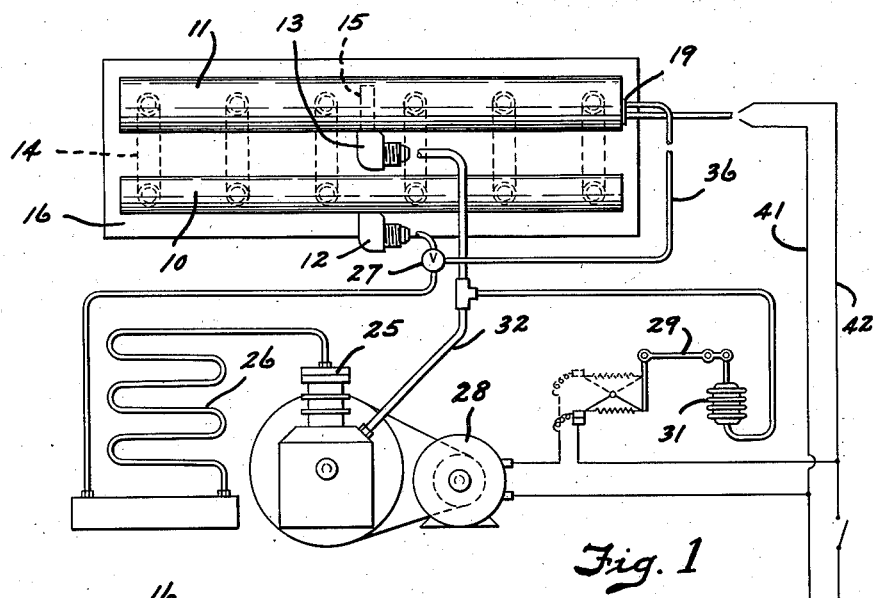
Figure 2:
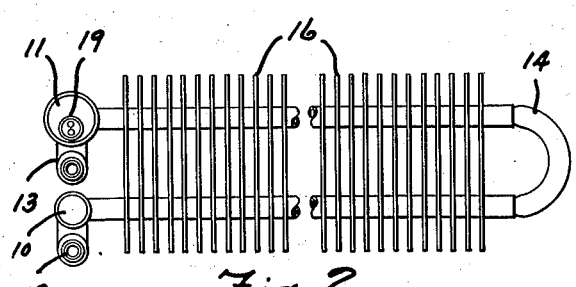

In the drawing:

Fig. 1 discloses a diagrammatic showing of a closed refrigerating system having my invention incorporated therein;

Fig. 2 is a front view of the evaporator employed in the refrigerating system shown in Fig. 1; and Fig. 3 is an enlarged vertical sectional view of a portion of the evaporator showing an arrangement of the elements constituting my invention therein.

Referring to the drawing, for the purpose of illustrating my invention, the evaporator includes a pair of headers 10 and 11 shown as elongated cylinders disposed one above the other. The lower header 10 is provided with an inlet connection 12 for receiving liquid refrigerant. Upper header 11 is provided with a gaseous refrigerant outlet connection 13. The connection 13 includes an extension or stand-pipe 15 which extends to a point near the top of header 11 (see Fig. 3) and is for the purpose of preventing liquid refrigerant from flowing into the suction line of the refrigerating system. A plurality of refrigerant conveying or distributing conduits 14 are connected in parallel to the headers 10 and 11. These conduits may be of any desired form and are preferably of the form as disclosed. The conduits 14 extend laterally from header 10 thence upwardly and horizontally to header 11. Each of these conduits may be constructed from a single length of tubing bent into the required form or they may be provided by two straight lengths of conduit connected by a U-shaped end connection as disclosed. A plurality of fins 16 of any desired shape or form are secured to and bridge the horizontally extending portions of conduits 14 to increase the heat absorbing capacity of the evaporator. The particular shape and arrangement of the fins 16 forms no part of my invention. A tubular member 19 is sealed to the front wall of header 11 and extends into the header and is closed at its inner end to form a well for the reception of a thermostat bulb to be hereinafter more fully described.

Referring to Fig. 1 the refrigerating system or the refrigerant liquefying and condensing unit operatively connected to the evaporator includes the customary compressor 25, condenser 26 and an expansion valve 27. The compressor is driven by a motor 28 under the control of a switch 29 actuated by expansion and contraction of a bellows 31 in response to pressures of refrigerant within the evaporator or within the low pressure portion of the system. Evaporated or gaseous refrigerant is withdrawn from the evaporator, by the compressor, through the vapor-return conduit 32. The valve 27 may be of any conventional and well known construction and is adapted to be intermittently opened and closed to permit liquid refrigerant to flow from the condenser or receiver connected thereto to the evaporator of the refrigerating system.

In order to keep liquid refrigerant distributed throughout the entire evaporator or to maintain a predetermined level of liquid refrigerant in the evaporator I employ a thermostat bulb 35 containing any suitable expansible and contractible fluid. Bulb 35 is mounted in the well 19 of the evaporator (see Fig. 3) and is connected with the expansion valve 27 by the conduit 36 (see Figs. 1 and 3). The expansion valve is normally adjusted to maintain the level of liquid refrigerant within the evaporator between predetermined limits.

As before stated the expansion valve 27 is adjusted and the thermostat for actuating same is ordinarily arranged to normally maintain the level of liquid refrigerant in the evaporator between certain predetermined limits. The thermostat bulb 35 is adapted to respond only to variations in the level of liquid refrigerant in the evaporator but as previously pointed out the location of the bulb 35 in evaporators of the type disclosed is such that the thermostat 35 will also respond, at certain times during operation of the system, to cold gaseous refrigerant in the evaporator. Without such provisions the thermostat 35 is not positive in its response to the liquid refrigerant level only in the evaporator and this level may vary beyond extreme limits thus destroying the desirable characteristics sought to be obtained by the refrigerating system. This desirable characteristic being that of providing a flooded evaporator without the use of a float valve mechanism. Therefore this invention has to do with the provision of a means for preventing the cold gaseous refrigerant from affecting or influencing the thermostat 35 so that the thermostat will be positive in responding to the level of liquid refrigerant only in the evaporator to thereby obviate the close adjustment of the expansion valve 27 relative to the thermostat.

I have found that if a small amount of artifical heat is supplied to the thermostat 35 at a predetermined constant rate the thermostat will be rendered responsive only to the liquid refrigerant level or to the amount of liquid refrigerant in contact with the walls of the well 19. Therefore I provide a well 38 in the thermostat bulb 35 and position a heater or an electric heating element 39 in the well 38. The heating element 39 is connected by wires 41 and 42 to the power lines leading to the switch 29 and motor 28 of the refrigerating system. As long as the main switch in the power line, leading to the refrigerating system, is closed the heating element 39 will be energized and a small amount of heat will be supplied to the thermostat bulb 35 at a constant predetermined rate.

The construction and adjustment of the valve 27 and the construction and arrangement of the thermostat 35 and the heating element 39 associated therewith is such that liquid refrigerant preferably does not rise above the level shown in Fig. 3 of the drawing. The fluid content of thermostat bulb 35 is such that as long as liquid refrigerant in the header 11 is at a level to completely submerge or to submerge the major portion of well 19 and consequently the bulb 35, located in the well 19, this bulb will not influence the valve 27 and valve 27 will remain closed to prevent liquid refrigerant from entering the evaporator. However, if and when during certain refrigeration demands upon the evaporator the level of liquid refrigerant therein will fall below the normal high level thereof, shown in the drawing, and will expose the walls of well 19 and consequently thermostat 35 to gaseous refrigerant above the liquid refrigerant in the evaporator. Since the well 19 and thermostat bulb 35 located therein is normally submerged in liquid refrigerant and since the liquid refrigerant is capable of absorbing and carrying away the heat generated by the heater 39, by evaporation of the liquid refrigerant, the thermostat 35 is prevented from influencing or causing valve 27 to be actuated. By diminishing the amount of liquid refrigerant in contact with the well 19 and consequently the bulb 35 located therein, and since the gaseous refrigerant is inefficient or less capable than liquid refrigerant of absorbing and carrying away heat generated by the heater 39 this heat will act upon the fluid in the thermostat bulb 35 to cause vaporization or expansion of the fluid thus rendering the bulb 35 effective for actuating the valve 27. Valve 27 is thereby opened in response to a change in the temperature of fluid in the thermostat 35 which is brought about by the lowered liquid refrigerant level and artificial heat supplied to the bulb 35 by the electric heater 39. The valve 27 upon being opened permits liquid refrigerant to flow from the liquid refrigerant supply line of the system to the interior of the evaporator until the level of liquid refrigerant reaches a height sufficient to completely submerge or to submerge the major portion of the well 19 and consequently thermostat 35 located in the well. After liquid refrigerant has attained its high level in the evaporator as described and as shown in the drawing the small amount of heat generated by the element 39 will again be absorbed and carried away by vaporization of the liquid refrigerant so as to permit the fluid content of bulb 35 to condense therein or contract thus rendering the thermostat 35 ineffective for influencing the valve 27.

From the foregoing it can be determined that I have provided an improved refrigerating system and have provided an improved control for governing the flow of liquid refrigerant to the evaporator of the system. My invention renders the control, which admits liquid refrigerant to the evaporator of the system, positive in its response only to the level of liquid refrigerant or to the amount thereof, in the evaporator thus preventing the thermostat of the control system from being affected by gaseous refrigerant in the evaporator. A definite liquid refrigerant level, between certain predetermined limits, can be maintained in the evaporator of my improved system without the use of a float actuated valve mechanism and without danger of the level of liquid refrigerant rising to a point in the evaporator where liquid refrigerant will be drawn into the suction line leading to the crankcase of the compressor of the system. My improved refrigerant flow control system also eliminates the necessity of closely adjusting the refrigerant expansion valve thus permitting the use of a more rugged and less expensive valve.

While the form of embodiment of the invention as herein disclosed, constitutes a preferred form, it is to be understood that other forms might be adopted, all coming within the scope of the claims which follow.

What is claimed is as follows:

1. A refrigerating system comprising in combination, an evaporator having a refrigerant inlet connection and a refrigerant outlet connection, means for circulating liquid refrigerant to said evaporator and for withdrawing gaseous refrigerant therefrom, means for controlling the flow of refrigerant to said evaporator to maintain a quantity of liquid refrigerant therein, said last named means including a portion thereof disposed in thermal contact with refrigerant in said evaporator, and means for supplying artificial heat to said portion of said last named means whereby said portion of said last named means is rendered responsive to a variation in the level of liquid refrigerant in the evaporator for actuating said refrigerant flow control means.

2. A refrigerating system comprising in combination an evaporator having a refrigerant inlet connection and a refrigerant outlet connection, means for circulating liquid refrigerant to said evaporator and for withdrawing gaseous refrigerant therefrom, means for controlling the flow of refrigerant to said evaporator to maintain a quantity of liquid refrigerant therein, said last named means including a portion thereof disposed in thermal contact with refrigerant in said evaporator, and means for supplying artificial heat at a substantially constant rate to said portion of said last named means whereby said portion of said last named means is rendered responsive to a variation in the level of liquid refrigerant in the evaporator for actuating said refrigerant flow control means.

3. A refrigerating system comprising in combination, an evaporator having a refrigerant inlet connection and a refrigerant outlet connection, means for circulating liquid refrigerant to said evaporator and for withdrawing gaseous refrigerant therefrom, means for controlling the flow of refrigerant to said evaporator to maintain a quantity of liquid refrigerant therein, said last named means including a portion thereof disposed in thermal contact with refrigerant in said evaporator, and an electric heater for supplying heat to said portion of said last named means whereby said portion of said last named means is rendered responsive to a variation in the level of liquid refrigerant in the evaporator for actuating said refrigerant flow control means.

4. A refrigerating system comprising in combination, an evaporator having a refrigerant inlet connection and a refrigerant outlet connection, means for circulating liquid refrigerant to said evaporator and for withdrawing gaseous refrigerant therefrom, means for controlling the flow of refrigerant to said evaporator to maintain a quantity of liquid refrigerant therein, said last named means including a portion thereof disposed in thermal contact with refrigerant in said evaporator, and an electric heater disposed in intimate thermal association with said portion of said last named means for supplying heat at a substantially constant predetermined rate thereto whereby said portion of said last named means is rendered responsive to a variation in the level of liquid refrigerant in the evaporator for actuating said refrigerant flow control means.

5. A refrigerating system comprising in combination an evaporator having a refrigerant inlet connection and a refrigerant outlet connection, means for circulating liquid refrigerant to said evaporator and for withdrawing gaseous refrigerant therefrom, a valve for controlling the flow of refrigerant to said evaporator to maintain a quantity of liquid refrigerant therein, a thermostat disposed in thermal contact with refrigerant in said evaporator and operatively connected with said valve, and an electric heating element disposed in intimate thermal contact with said thermostat for supplying heat at a substantially constant predetermined rate thereto whereby said thermostat is rendered responsive to a variation in the level of liquid refrigerant in the evaporator for actuating said refrigerant flow control valve.

6. A refrigerating system comprising in combination, a cooling element, means for supplying refrigerant to said cooling element and for maintaining a substantial amount of refrigerant therein, said means including a portion disposed in thermal contact with refrigerant in said cooling element, and means for heating said portion of said means whereby said portion is rendered responsive to a variation in the amount of refrigerant in the cooling element for actuating said supply means.

7. A refrigerating system comprising in combination, a cooling element, means for supplying a liquid refrigerating medium to said cooling element and for maintaining a substantial amount of the liquid refrigerant therein, said means including a portion disposed in thermal contact with refrigerant in said cooling element, and means for supplying artificial heat to said portion of said means whereby said portion of said means is rendered responsive to a variation in the level of liquid refrigerant in the cooling element for actuating said supply means.

8. A refrigerating system comprising in combination, a cooling element, a device for controlling between predetermined limits the temperature to be produced by said cooling element, said control device being located in heat transfer relation with said cooling element and directly exposed to the cooling effect produced thereby, means for at all times maintaining the temperature of said control device beyond the limits of temperature at which the cooling element is maintained, and said control device being operative in response to a varying rate of heat transfer between said cooling element and said control device.

EDWARD B. NEWILL.